us009369599B2

United States Patent
Yabuuchi

(10) Patent No.: US 9,369,599 B2
(45) Date of Patent: Jun. 14, 2016

(54) IMAGE READING DEVICE, IMAGE FORMING APPARATUS, AND METHOD FOR CONTROLLING IMAGE READING DEVICE TO REMOVE BLANK SHEET IMAGE DATA

(71) Applicant: KYOCERA Document Solutions Inc., Osaka (JP)

(72) Inventor: Yasuyuki Yabuuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/650,864

(22) PCT Filed: May 21, 2014

(86) PCT No.: PCT/JP2014/063437
§ 371 (c)(1),
(2) Date: Jun. 9, 2015

(87) PCT Pub. No.: WO2014/192613
PCT Pub. Date: Dec. 4, 2014

(65) Prior Publication Data
US 2015/0326743 A1    Nov. 12, 2015

(30) Foreign Application Priority Data

May 30, 2013   (JP) ................................ 2013-114535

(51) Int. Cl.
*H04N 1/00* (2006.01)
*G03B 27/50* (2006.01)
(52) U.S. Cl.
CPC ....... *H04N 1/00779* (2013.01); *H04N 1/00591* (2013.01); *H04N 1/00708* (2013.01);
(Continued)

(58) Field of Classification Search
None
See application file for complete search history.

(56) References Cited

U.S. PATENT DOCUMENTS 7,751,071 B2 * 7/2010 Namizuka ............. G06T 3/4023
358/1.13
8,587,835 B2 * 11/2013 Sato .................... H04N 1/00803
358/1.18
(Continued)

FOREIGN PATENT DOCUMENTS

JP    10-229484 A    8/1998
JP    2006-279094 A    10/2006
(Continued)

OTHER PUBLICATIONS
International Search Report dated Jul. 1, 2014, issued to the corresponding International Application No. PCT/JP2014/063437.
(Continued)

*Primary Examiner* — Paul F Payer
(74) *Attorney, Agent, or Firm* — Stein IP, LLC

(57) ABSTRACT

An image reading device (100) includes an image reading unit (1) for reading a document, a document feeder unit (2) for feeding document sheets, a setting input unit (3) for accepting a mixed setting mode, a size determination unit (7) for determining a main scanning direction size, a blank sheet detection unit (8) configured to repeat detection whether or not a blank sheet detection area (F) in image data is blank since before one page reading is completed, and when reading in the mixed setting mode, to perform the blank sheet detection process in main scanning widths of a plurality of the blank sheet detection areas (F), so as to detect whether or not the document sheet is blank in the main scanning width corresponding to the determined main scanning direction size, and a blank sheet deletion unit (9) for deleting document image data of the detected blank sheet.

9 Claims, 10 Drawing Sheets

(52) U.S. Cl.
CPC ....... *H04N1/00726* (2013.01); *H04N 1/00737* (2013.01); *H04N 1/00806* (2013.01); *H04N 1/00822* (2013.01); *G03B 27/50* (2013.01); *H04N 2201/0081* (2013.01)

(56) References Cited

U.S. PATENT DOCUMENTS

2006/0291013 A1* 12/2006 Shimizu ............... G03G 15/607
    358/498
2014/0320934 A1* 10/2014 Muraishi ............. H04N 1/4074
    358/453

FOREIGN PATENT DOCUMENTS

| | | |
|---|---|---|
| JP | 2008-219810 A | 9/2008 |
| JP | 2012-209908 A | 10/2012 |
| JP | 2012-222791 A | 11/2012 |

OTHER PUBLICATIONS

Written Opinion of International Searching Authority and Translation dated Jul. 1, 2014, issued to the corresponding International Application No. PCT/JP2014/063437.

* cited by examiner (SAME WIDTH MIXED SETTING)

(DIFFERENT WIDTH MIXED SETTING)

FIG.8
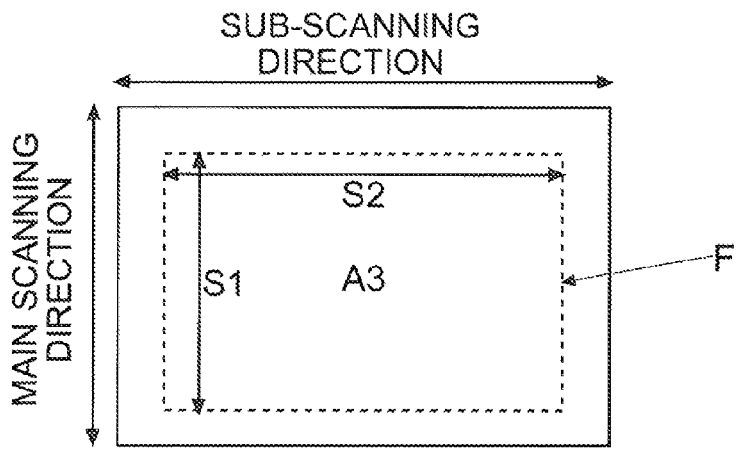
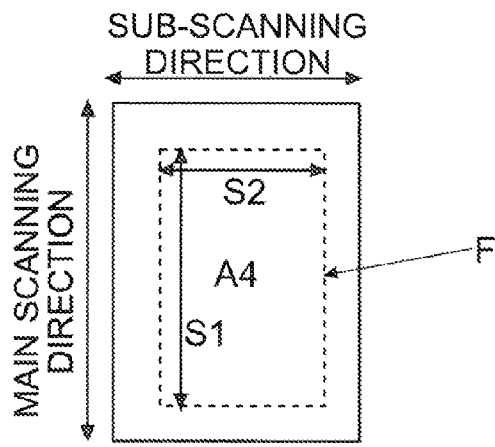
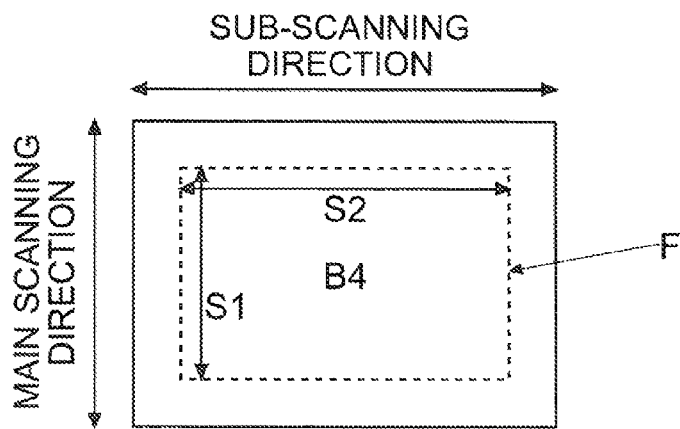

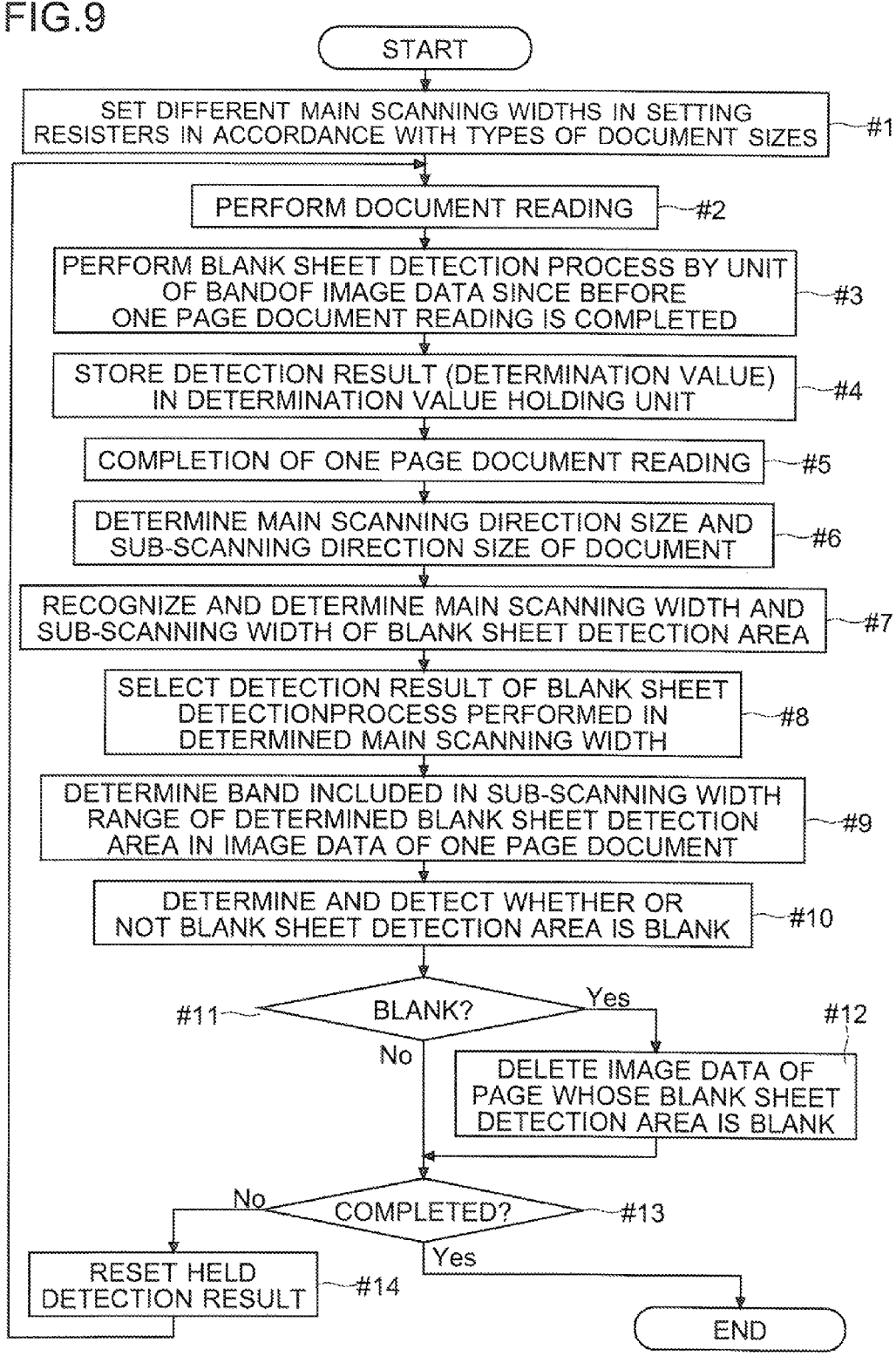

IMAGE READING DEVICE, IMAGE FORMING APPARATUS, AND METHOD FOR CONTROLLING IMAGE READING DEVICE TO REMOVE BLANK SHEET IMAGE DATA

CROSS-REFERENCE TO RELATED APPLICATIONS

This application is a national stage of International Application No. PCT/JP2014/063437, filed May 21, 2014, which claims the benefit of priority to Japanese Application No. 2013-114535, filed May 30, 2013, in the Japanese Patent Office. All disclosures of the documents named above are incorporated herein by reference.

BACKGROUND OF THE INVENTION

1. Field of the Invention

The present invention relates to an image reading device for reading a document, a method for controlling the image reading device, and an image forming apparatus including the image reading device.

2. Description of the Related Art

The image reading device reads a document so as to generate image data. The image forming apparatus such as a multifunction peripheral, a copier, or a FAX apparatus may include a document feeding device for automatically and successively feeding document sheets to a document read position for the image reading device. However, blank image data may be generated in case where a blank sheet is inserted in the document sheets, or in case where a backside of a document sheet is read because the sheet is set upside down. The blank sheet has no significant information. Therefore, a job (such as printing or image data transmission) based on the blank sheet image data is wasteful. Therefore, there is an image reading device that removes blank sheet image data from image data obtained by reading. An example of this image reading device is described in Patent Document 1.

Specifically, Patent Document 1 describes an image reading device including a reading unit for reading an image of a document, a blank sheet determination unit for determining whether or not a document sheet is blank sheet based on image data read by the reading unit, and a deletion unit for deleting the image data read by the reading unit when it is determined that the document sheet is a blank sheet by the blank sheet determination unit.

PRIOR ART DOCUMENTS

Patent Documents

Patent Document 1: JP-A-10-229484

SUMMARY OF THE INVENTION

Problem to be Solved by the Invention

When performing blank sheet detection, an area for detecting whether or not the document sheet is a blank sheet may be set in one page document (image data) by considering margins in the document page. For instance, the user selects a document size and inputs distances from upper, lower, left, and right sides of the document to the image reading device. The inside area defined by the input distances from the sides of the document is regarded as a blank sheet detection area. The image reading device determines whether or not there is information such as a character, a mark, or a figure not in the entire page of the document image data but in the specific area (blank sheet detection area) within the one-page image data, so as to detect whether or not the document sheet is a blank sheet. Note that a range and size of the blank sheet detection area may be set as default in accordance with a selected document size.

On the other hand, there is an image reading device capable of generating image data having appropriate sizes corresponding to document sizes when document sheets having different sizes are set and fed one by one by the document feeding device. For instance, the image reading device detects a document size of each document sheet from read image data or the like and generates image data corresponding to the detected document size.

However, in setting of the blank sheet detection, there is only one pattern of a selectable document size and a size of the blank sheet detection area in a document sheet. Therefore, when the document size is not specified in the case where the document sheets having different sizes are set (when reading document sheets having different sizes in one job), the blank sheet detection area is not appropriate for a document sheet having a size different from the set document size. There may be cases where detection whether or not the document sheet is a blank sheet is performed in an area including an area that is not the blank sheet detection area, or in an area without including an area to be the blank sheet detection area. Therefore, when reading document sheets in the case where document sheets having different sizes are set (hereinafter referred to also as "document mixed setting"), there is a problem of accuracy of the blank sheet detection. This problem is described below with reference to FIGS. 10A to 10C.

FIGS. 10A to 10C are explanatory diagrams showing examples of cases having a problem of accuracy of the blank sheet detection in the document mixed setting.

First, FIG. 10A shows an A3 size on the left side and an A4 size on the right side. In addition, a blank sheet detection area F0 is set on the basis of the A3 size. FIG. 10A shows a case having the same document size in a main scanning direction and different document sizes in a sub-scanning direction (hereinafter referred to also as "same width mixed setting"). When the blank sheet detection area F0 set on the basis of the A3 size is applied to the document sheet (A4 portrait size) smaller than the set size of the blank sheet detection area F0, the blank sheet detection area F0 exceeds the A4 document sheet. Therefore, when the A4 document sheet is read in the mixed setting mode, the area (shown by hatching in FIG. 10A), which should not be regarded as the blank sheet detection area F0 in normal case (when the blank sheet detection area F0 is set on the basis of the A4 size), is regarded as the blank sheet detection area F0. Therefore, image data of the page the user wants to delete as a blank sheet may be left.

In addition, FIG. 10B shows the A4 size on the left side and the A3 size on the right side. In addition, the blank sheet detection area F0 is set on the basis of the A4. In this case, FIG. 10B also shows a case having the same document size in the main scanning direction and different document sizes in the sub-scanning direction (the same width mixed setting). When the blank sheet detection area F0 set on the basis of the A4 size is applied to the document sheet (A3 landscape size) larger than the set size of the blank sheet detection area F0, the blank sheet detection area F0 becomes smaller than a desired size. Therefore, when the A3 document sheet is read in the mixed setting mode, the area (shown by hatching in FIG. 10B), which should be regarded as the blank sheet detection area F0 in normal case (when the blank sheet detection area F0 is set on the basis of the A3 size), is not regarded as the blank sheet detection area F0. Therefore, image data of the page the user does not want to delete as a blank sheet may be deleted as a blank sheet.

In addition, FIG. 10C shows the A3 size on the left side and the B4 size on the right side. In the case of FIG. 10C, the size in the main scanning direction and the size in the sub-scanning direction are both different (hereinafter referred to also as "different width mixed setting"). Further, when the blank sheet detection area F0 set on the basis of the A3 size is applied to the document sheet (B4 landscape size) smaller than the set size of the blank sheet detection area F0, the blank sheet detection area F0 becomes larger than a desired size so as to include an area that should not be the blank sheet detection area F0. Therefore, when the B4 document sheet is read in the mixed setting mode, the area, which should not be regarded as the blank sheet detection area F0 in normal case (when the blank sheet detection area F0 is set on the basis of the B4 size), is regarded as the blank sheet detection area F0. Therefore, image data of the page the user wants to delete as a blank sheet may be left.

In this way, there is a problem that even if it is possible to select a document size and to set the blank sheet detection area, when reading a document sheet having a size different from the set size for the blank sheet detection included in the document sheets set in the mixed setting, the blank sheet detection process cannot be performed in the appropriate blank sheet detection area, and hence the blank sheet detection cannot be performed accurately.

Further, it can be considered to determine the document size based on image data of the document after completing reading and generating image data of one page of the document, and to perform the blank sheet detection process after setting an appropriate blank sheet detection area in accordance with the determined document size. However, when the blank sheet detection process is started after completing generation of the image data of the one page of the document, feeding of the document sheets may be temporarily stopped. Therefore, the speed of reading the document sheets may be decreased. In addition, completion of the blank sheet detection process is delayed. In the job execution, start of process to be performed after the blank sheet detection process is delayed, and hence a time necessary for the job based on the document image data is increased.

Here, in the technique described in Patent Document 1, the blank sheet image data is detected from image data of individual pages, and the problem in the case of the document mixed setting is not considered. In addition, because the blank sheet detection process is performed after reading of the document sheets is completed, the speed of reading the document is slow. Therefore, Patent Document 1 does not describe a technique for solving the above-mentioned problem.

In view of the above-mentioned problem, it is an object of the present invention to enable to perform the blank sheet detection process on each document image data on the basis of an appropriate blank sheet detection area so as to detect whether or not the image data is a blank sheet data, without decreasing the reading speed, even in case where the document sheets are successively read one by one from document sheets having different sizes set in the mixed setting.

Means for Solving the Problem

An image reading device according to an aspect of the present invention includes an image reading unit for reading a document, a document feeder unit for feeding set document sheets one by one to a read position of the image reading unit, a setting input unit for accepting a document read instruction in a mixed setting mode in which a plurality of document sheets having different sizes are set on the document feeder unit and are read, a size determination unit for determining a size of each page of the document read by the image reading unit, a blank sheet detection unit configured to repeat detection whether or not a blank sheet detection area in image data for performing blank sheet detection is blank since before one page reading of the document is completed by line unit in the main scanning direction of the image data obtained by reading the document, and in case of reading in the mixed setting mode, to detect whether or not the document sheet is a blank sheet based on a detection result in a sub-scanning width range in the blank sheet detection area corresponding to a size of the document sheet in the sub-scanning direction determined by the size determination unit in one-page document image data, and a blank sheet deletion unit for deleting image data of the document sheet whose blank sheet detection area is detected as blank, so that the image data is not used for a job.

An image forming apparatus according to another aspect of the present invention includes the image reading device described above.

A method for controlling an image reading device according to still another aspect of the present invention includes reading a document, feeding set document sheets one by one to a read position, accepting a document read instruction in a mixed setting mode in which a plurality of document sheets having different sizes are set on the document feeder unit and are read, determining a size of each page of the read document, repeating detection whether or not a blank sheet detection area in image data for performing blank sheet detection is blank since before one page reading of the document is completed, detecting whether or not the document sheet is a blank sheet based on a detection result in a sub-scanning width range in the blank sheet detection area corresponding to a determined size of the document sheet in the sub-scanning direction in one-page document image data, when performing reading in the mixed setting mode, and deleting image data of the document sheet whose blank sheet detection area is detected as blank, so that the image data is not used for a job.

Effects of the Invention

According to the present invention, it is possible to provide an image reading device and an image forming apparatus, in which when document sheets having different sizes are set in mixed setting and are successively read, it is not necessary to decrease a reading speed even if the blank sheet detection process is performed. In addition, even in case where the document sheets having different sizes in mixed setting are successively read, an appropriate blank sheet detection area is set for each document sheet, and hence it is possible to detect whether or not the image data is a blank sheet data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8 is a diagram showing that the blank sheet detection area has a width in the main scanning direction (main scanning width) and a width in the sub-scanning direction (sub-scanning width), which are different for individual document sizes.

FIG. 9 is a flowchart showing an example of a flow of the blank sheet detection in the mixed setting mode.

DETAILED DESCRIPTION OF THE EMBODIMENTS

Now, an embodiment of the present invention is described with reference to FIG. 1 to FIG. 9. In the following description, a multifunction peripheral 1000 (corresponding to the image forming apparatus) including an image reading device 100 is exemplified and described. However, elements such as structures and layouts described in this embodiment are merely examples for description and should not be interpreted as limiting the scope of the invention.

(Structure of Multifunction Peripheral 1000)

Figure 1:
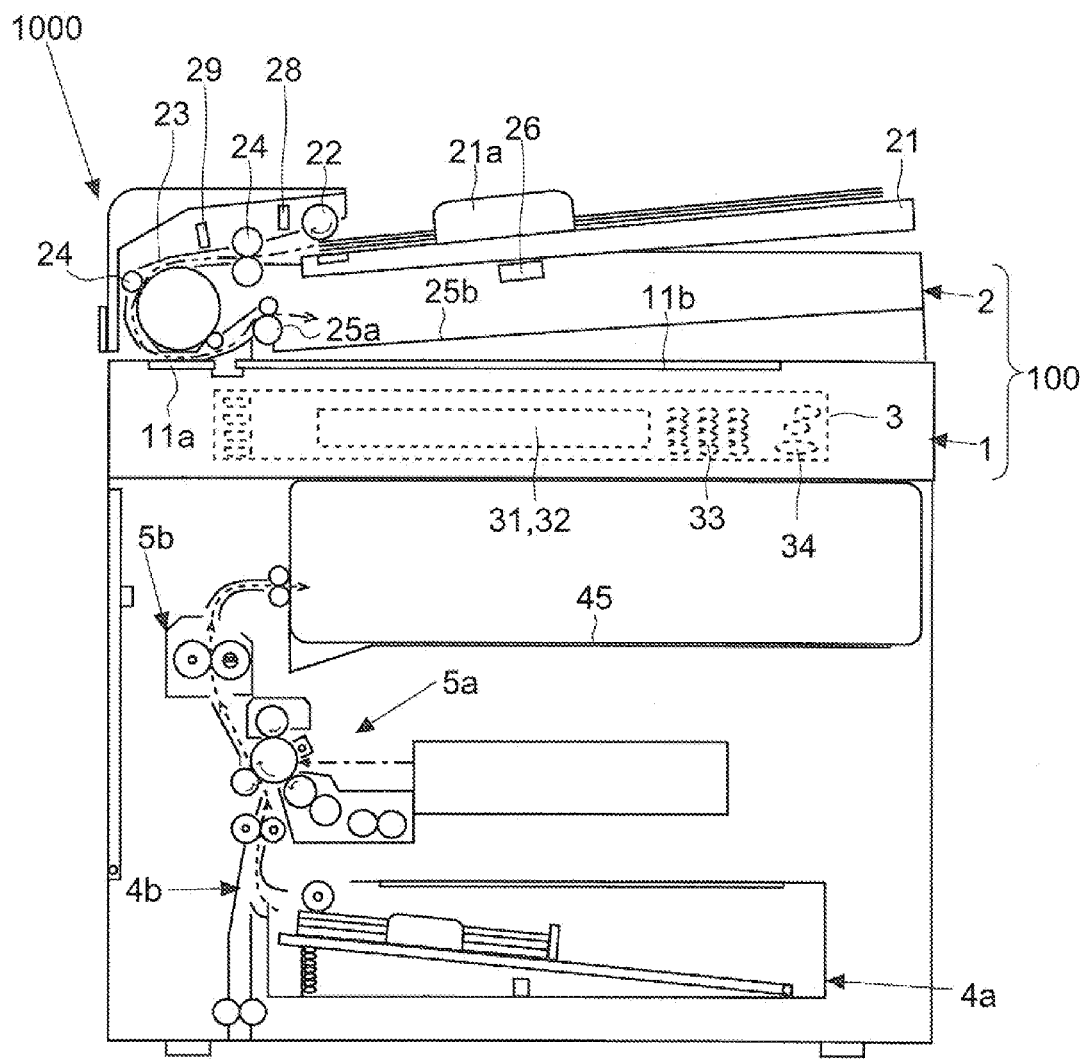
FIG. 1 is a diagram showing an example of a multifunction peripheral.

First, with reference to FIG. 1, an outline of the multifunction peripheral 1000 (image forming apparatus) according to the embodiment is described. FIG. 1 is a diagram showing an example of the multifunction peripheral 1000.

In an upper part of the multifunction peripheral 1000 of this embodiment, there is disposed the image reading device 100 including a document feeder unit 2 and an image reading unit 1 (details are described later). In addition, on the upper front part (in a position shown by a broken line in FIG. 1) of the multifunction peripheral 1000, there is disposed an operation panel 3 (corresponding to the setting input unit) for accepting various settings for document reading, copying, transmission, and the like, and for displaying a state of the multifunction peripheral 1000. In addition, in a main body of the multifunction peripheral 1000, there are disposed a paper sheet feeder 4a, a transport unit 4b, an image forming unit 5a, a fixing unit 5b, and the like.

As shown in FIG. 1 by a broken line, the operation panel 3 is disposed on the upper front part of the multifunction peripheral 1000 (in the front face of the image reading unit 1). Further, the operation panel 3 includes a touch panel unit 31 and a liquid crystal display unit 32. The liquid crystal display unit 32 display a state of the multifunction peripheral 1000 and screens for various settings including software keys for setting functions of a job to be executed. A position touched on the touch panel unit 31 and a key or button displayed at the touched position are recognized by the operation panel 3. In addition, the operation panel 3 includes hardware keys such as a ten-key unit 33 for numerical input and a start key 34 for instructing to start execution of a job. In this way, the operation panel 3 accepts setting inputs for a job such as document reading by the software key or the hardware key.

The paper sheet feeder 4a sends out paper sheets one by one in printing. The transport unit 4b is a path for transporting the paper sheet in the multifunction peripheral 1000. The image forming unit 5a forms an image (toner image) based on image data and transfers the toner image onto the paper sheet transported. The fixing unit 5b fixes the toner image transferred onto the paper sheet. The paper sheet after fixing the toner image is discharged onto a discharge tray 45.

(Structure of Image Reading Device 100)

Figure 2:
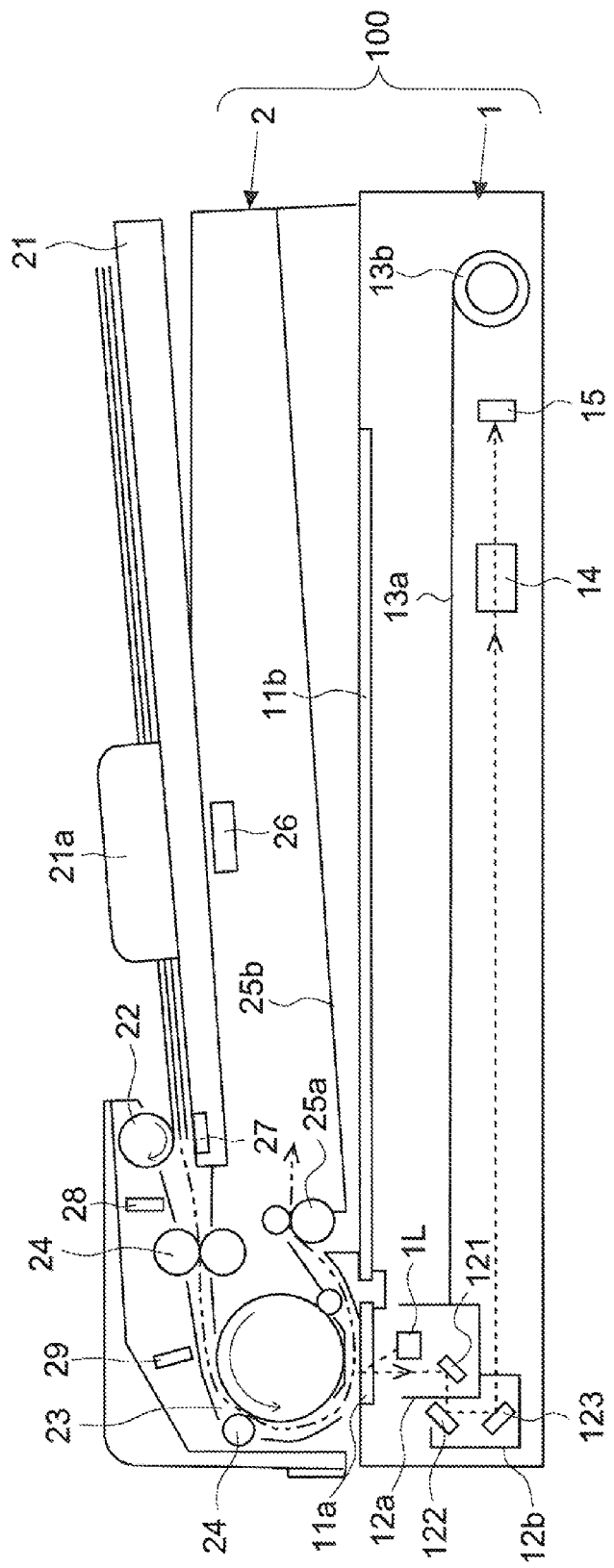
FIG. 2 is a diagram showing an example of an image reading device.

Next, with reference to FIG. 2, an example of the image reading device 100 according to the embodiment is described. FIG. 2 is a diagram showing an example of the image reading device 100.

First, the document feeder unit 2 automatically and successively feeds document sheets to be read one by one to a read position (i.e., a feed reading contact glass 11a described later). The document feeder unit 2 includes, in order from an upstream side in a document feed direction, a document tray 21, a document feed roller 22, a document feed path 23, a plurality of document feed roller pairs 24, a document discharge roller pair 25a, a document discharge tray 25b, and the like. In addition, the document feeder unit 2 is attached to the image reading unit 1 in a vertically openable and closable manner about a pivot axis on the back side in FIG. 2, and functions as a cover (document pressing member) for pressing contact glasses of the image reading unit 1 from above.

A plurality of document sheets to be read are set on the document tray 21. The document tray 21 is provided with a restriction guide 21a, which slides in a width direction of the document (i.e., the main scanning direction or the direction perpendicular to the paper plane of FIG. 2) so as to restrict a set position of the document by sandwiching the same. The user sets the document sheets and slides the restriction guide 21a so that the document sheets do not move or tilt.

Further, the document feed roller 22 contacts with the uppermost document sheet among the document sheets set on the document tray 21. When an operation for executing document reading (e.g., pressing the start key 34) is input to the multifunction peripheral 1000, the document feed roller 22 repeats rotation and stop so as to feed the document sheets one by one to the document feed path 23 at a constant interval.

The fed document sheet is guided and transported by the plurality of document feed roller pairs 24 and a guide, so as to pass the upper surface of the feed reading contact glass 11a disposed on the upper surface of the image reading unit 1. When the document sheet passes, the image reading unit 1 reads the document sheet. Then, the document sheet after reading is discharged onto the document discharge tray 25b through the document discharge roller pair 25a (the document feed path is shown by a double-dot dashed line). Further, the above-mentioned rotating members (i.e., the document feed roller 22, the document feed roller pair 24, and the document discharge roller pair 25a) are rotated by a document feed motor 2m (see FIG. 4) as a drive source.

Next, the image reading unit 1 is described. As shown in FIG. 1 and FIG. 2, the image reading unit 1 has a box-shaped case. Further, on the left side of the upper surface of the image reading unit 1, there is disposed a feed reading contact glass 11a like a transparent plate elongated in the main scanning direction (perpendicular to the paper plane of FIG. 2). Further, a place reading contact glass 11b is disposed on the right side of the upper surface of the image reading unit 1. It is possible to lift the document feeder unit 2 and to place a document (such as a book) facing downward, so that the document is placed on the place reading contact glass 11*b*.

In addition, as shown in FIG. 2, in the case of the image reading unit 1, there are disposed a first moving frame 12*a*, a second moving frame 12*b*, a wire 13*a*, a winding drum 13*b*, a lens 14, and a lamp 1L (such as an LED) for irradiating the document with light, an image sensor 15 for receiving light from the document and for reading the document by one line so as to generate image data, and the like. For instance, the image sensor 15 is constituted of a charge coupled device (CCD) including photoelectric conversion elements aligned linearly in the main scanning direction, so as to read the document by one line based on the reflection light from the document. For instance, the image sensor 15 is a line sensor in which a plurality of right receiving elements arranged in three lines of R, G, and B so as to support reading color.

A first mirror 121, a second mirror 122, and a third mirror 123 guide the reflection light from the document to the lens 14. The reflection light is condensed by the lens 14 and enters the image sensor 15. Then, the image sensor 15 converts the reflection light into an analog electric signal corresponding to image density. The reading is performed by line in the main scanning direction of the document (perpendicular to the document feed direction), and the reading by line is successively repeated in the sub-scanning direction (i.e., in the document feed direction), so that one document sheet is read.

Further, the first moving frame 12*a* supports the lamp 1L for emitting light in the upper part and the first mirror 121 in the lower part. The second moving frame 12*b* supports the second mirror 122 in the upper part and the third mirror 123 in the lower part. In addition, the first moving frame 12*a* is disposed above the second moving frame 12*b*. In addition, the first moving frame 12*a* and the second moving frame 12*b* are connected to a plurality of wires 13*a* (though only one wire is shown in FIG. 2 for convenience sake). In addition, the wire 13*a* is connected to the winding drum 13*b*. The winding drum 13*b* is rotated forward and backward by a winding motor 1*m* (see FIG. 4) as a drive source. Thus, the first moving frame 12*a* and the second moving frame 12*b* can be freely moved in the horizontal direction (i.e., the left and right direction of the image reading device 100).

In the case of reading the document sheet fed by the document feeder unit 2, the winding motor 1*m* is driven, and then the first moving frame 12*a* and the second moving frame 12*b* come to a standstill at a position below the feed reading contact glass 11*a* (i.e., the read position). Then, the lamp 1L irradiates the passing document sheet with light. On the other hand, in the case of reading a document placed on the place reading contact glass 11*b*, the first moving frame 12*a* and the second moving frame 12*b* are moved by the winding drum 13*b* and the wire 13*a* horizontally from a home position in the right direction in FIG. 2. In this way, a scanning operation is performed sequentially and continuously to the end of the document, and the entire document is read so that the document image is converted into an electric signal.

(Hardware Structure of Multifunction Peripheral 1000)

Figure 3:
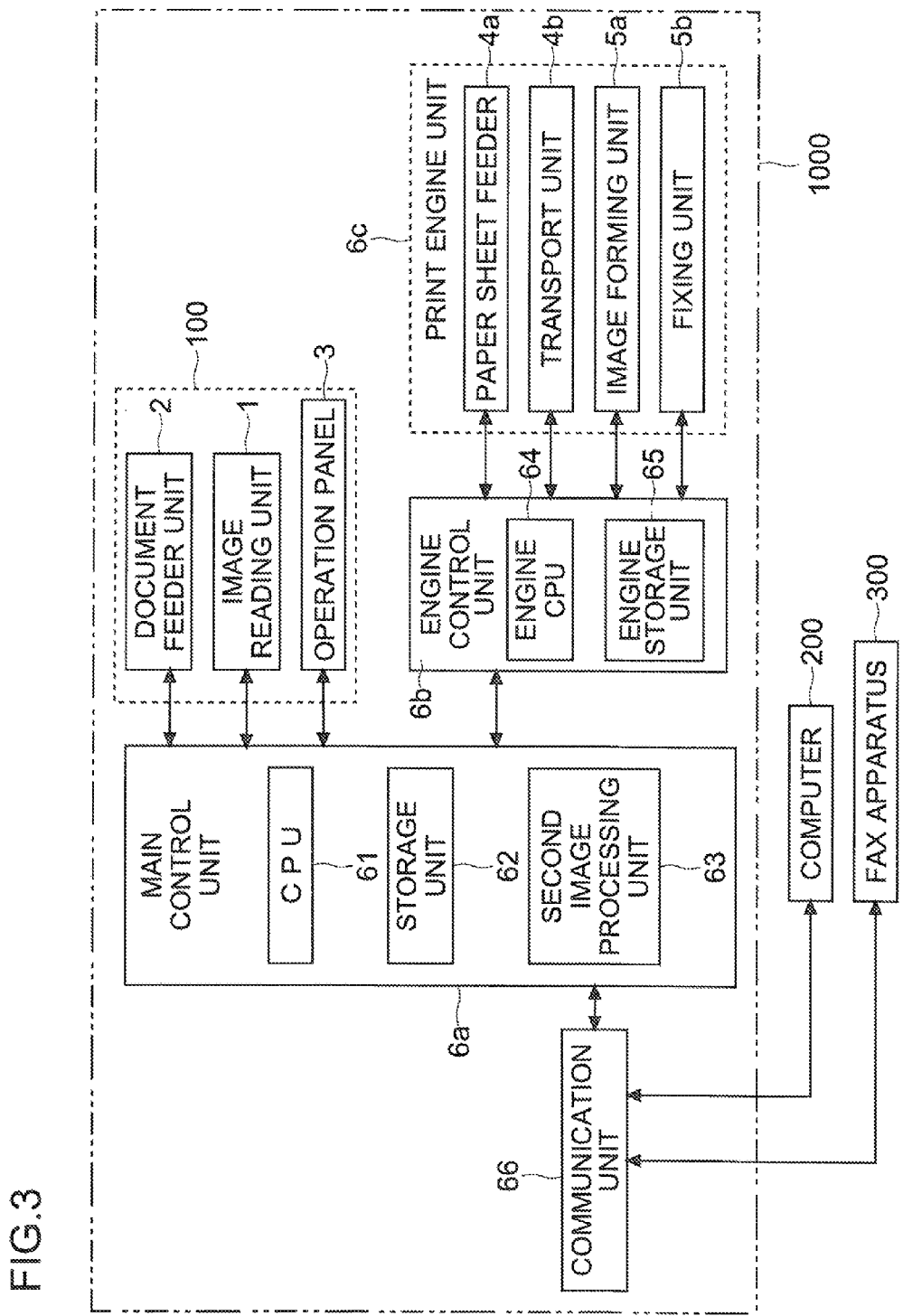
FIG. 3 is a block diagram showing an example of a hardware structure of the multifunction peripheral.

Next, with reference to FIG. 3, an example of a hardware structure of the multifunction peripheral 1000 according to the embodiment is described. FIG. 3 is a block diagram showing an example of the hardware structure of the multifunction peripheral 1000.

First, a main control unit 6*a* for controlling operation of the multifunction peripheral 1000 is disposed in the main body of the multifunction peripheral 1000. The main control unit 6*a* is a circuit board. For instance, the main control unit 6*a* includes a CPU 61 as a portion for performing control. The main control unit 6*a* manages the entire control of the multifunction peripheral 1000. For instance, main control unit 6*a* has functions of the entire control, communication control, and image processing.

The main control unit 6*a* includes a storage unit 62. The storage unit 62 stores a control program for the multifunction peripheral 1000, control data for the same, image data, and the like. The CPU 61 performs a calculation process, and outputs and input control signals based on the program and data stored in the storage unit 62, so as to control the multifunction peripheral 1000.

In addition, there is disposed a second image processing unit 63 that performs various image processings for copying, transmission, and the like on the image data processed by a first image processing unit 16 (details are described later). For instance, the second image processing unit 63 is constituted of an ASIC, a memory, and the like, so as to perform various image processings such as a density conversion, scaling, rotation, compression and expansion, data format conversion, and other known image processing.

In addition, in order to perform image formation and paper sheet transportation, there is disposed an engine control unit 6*b* for controlling operations and processes concerning printing such as turning on and off of motors for rotating various rotating members, paper sheet feeding, paper sheet transportation, and toner image formation. The engine control unit 6*b* is connected to the main control unit 6*a* and the like in a communicable manner. In accordance with an instruction from the main control unit 6*a*, the engine control unit 6*b* actually controls a print engine unit 6*c* for printing (such as the paper sheet feeder 4*a*, the transport unit 4*b*, the image forming unit 5*a*, and the fixing unit 5*b*). For instance, the engine control unit 6*b* includes an engine CPU 64 as a calculation processing unit. In addition, the engine control unit 6*b* includes an engine storage unit 65 for storing a program and data for controlling the objects to be controlled.

In addition, the main control unit 6*a* is connected to the document feeder unit 2, the image reading unit 1, and the like in a communicable manner, so as to control the document feeder unit 2 and the image reading unit 1 to read a document and to generate image data. In addition, the main control unit 6*a* is connected to the operation panel 3 in a communicable manner, and contents of setting and input to the operation panel 3 are sent to the main control unit 6*a*. The main control unit 6*a* gives instructions to the individual units of the multifunction peripheral 1000 so that the individual units work in accordance with the contents of setting.

Further, the main control unit 6*a* is connected to a communication unit 66. The communication unit 66 communicates with a computer 200 (such as a personal computer or a server) or a FAX apparatus 300 on the other end via a network, a cable, or a communication network. In this way, the multifunction peripheral 1000 can receive image data and the like from the computer 200 so as to print (as a printer function), can store image data read by the image reading unit 1 in the storage unit 62 so as to send the image data to the computer 200 (as a scanner function), and can transmit and receive image data to and from the FAX apparatus 300 in the outside (as a FAX function).

(Hardware Structure of Image Reading Device 100)

Figure 4:
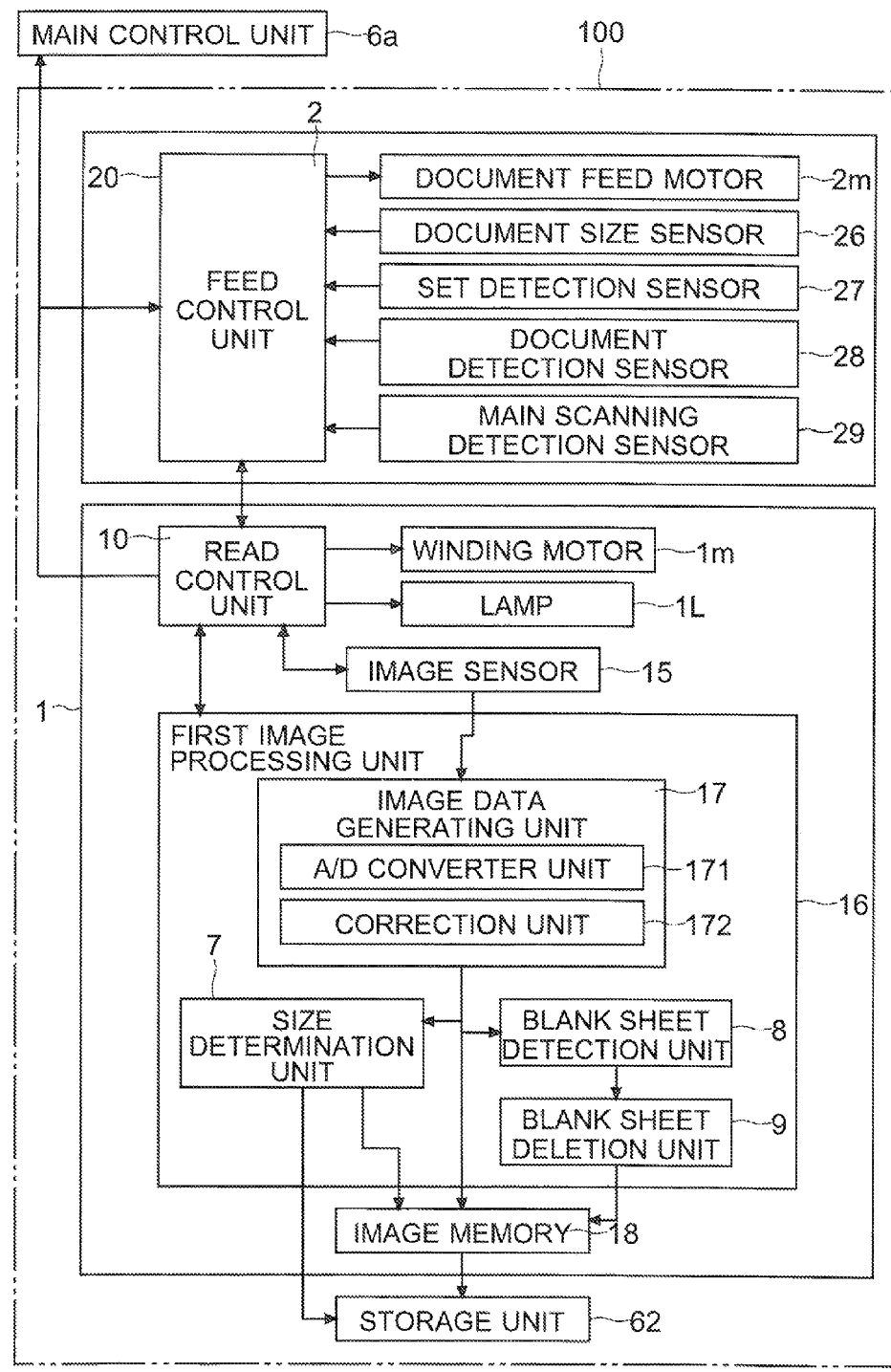
FIG. 4 is a block diagram showing an example of a structure of the image reading device.

Next, with reference to FIG. 4, an example of a hardware structure of the image reading device 100 according to the embodiment is described. FIG. 4 is a block diagram showing an example of a structure of the image reading device 100.

A control unit is disposed in each of the document feeder unit 2 and the image reading unit 1 included in the image reading device 100 of this embodiment. The document feeder unit 2 is provided with a feed control unit 20 for controlling operation of the document feeder unit 2. On the other hand, the image reading unit 1 is provided with a read control unit 10 for controlling operation of the image reading unit 1.

First, the feed control unit 20 is connected to the main control unit 6a and the read control unit 10 described above, so as to control operation of the document feeder unit 2 in accordance with instructions and signals from the main control unit 6a and the read control unit 10. The feed control unit 20 includes a CPU as a central processing unit, and a ROM and RAM for storing a control program and data. The feed control unit 20 communicates with the main control unit 6a and the like. In addition, the feed control unit 20 receives instructions from the main control unit 6a and the like so as to control operation of the document feeder unit 2.

For instance, the feed control unit 20 recognizes a size in the main scanning direction of a document sheet set on the document tray 21 based on an output of a document size sensor 26 (see FIG. 2) disposed in the document feeder unit 2. For instance, the document size sensor 26 may be a sensor that includes a variable resistor whose resistance varies in accordance with a position of the restriction guide 21a so that an output value of the sensor varies depending on a position of the restriction guide 21a, or may be a sensor including a plurality of photosensors arranged in the main scanning direction for detecting presence or absence of a paper sheet.

In addition, the feed control unit 20 recognizes whether or not a document sheet is set on the document tray 21 based on an output of a set detection sensor 27 (see FIG. 2) disposed in the document feeder unit 2. In addition, the set detection sensor 27 is a sensor whose output value varies depending on whether or not a document sheet is set on the document tray 21. For instance, the set detection sensor 27 may be a photosensor detecting presence or absence of a paper sheet.

For instance, when the main control unit 6a instructs to read a document, in the case where it is detected that a document is set on the document tray 21, the feed control unit 20 drives the document feed motor 2m so that the document feed roller 22, the document feed roller pair 24, and the like are rotated.

In addition, a document detection sensor 28 (see FIG. 2) for detecting arrival or passing of a document sheet is disposed in the document feed path 23 between the document feed roller 22 and the feed reading contact glass 11a. In accordance with an output of the document detection sensor 28, the feed control unit 20 recognizes presence or absence of a document sheet and arrival or passing of a document sheet at the position (point) where the document detection sensor 28 is disposed. In addition, the document detection sensor 28 is a sensor whose output value varies depending on presence or absence of a document sheet. For instance, the document detection sensor 28 may be a photosensor whose output changes between a high level and a low level depending on presence or absence of a paper sheet.

Next, the read control unit 10 is connected to the main control unit 6a and the feed control unit 20 described above in a communicable manner. Further, the read control unit 10 receives instructions and signals from the main control unit 6a so as to control operation of individual parts in the image reading unit 1. The read control unit 10 also includes a CPU as a central processing unit, and a ROM and RAM for storing a program and data necessary for controlling the image reading device 100.

Further, when receiving a document read instruction from the main control unit 6a such as pressing of the start key 34 on the operation panel 3, the read control unit 10 performs operation control of the image reading unit 1, transmission control of the image data obtained by reading to the storage unit 62 (main control unit 6a), and other control.

The read control unit 10 is connected to the winding motor 1m. In this way, the read control unit 10 controls rotation of the winding motor 1m so as to rotate the winding drum 13b and to move the moving frames. When detecting that a document sheet is set on the document tray 21 or that there is no document sheet, the feed control unit 20 informs the read control unit 10 of the detection result. In document reading when a document sheet is set on the document tray 21, the read control unit 10 moves the moving frames to the position below the feed reading contact glass 11a. In document reading when a document sheet is not set on the document tray 21, the read control unit 10 rotates the winding drum 13b and controls to read a document on the place reading contact glass 11b.

In addition, the read control unit 10 controls turning on and off of the lamp 1L. When reading a document, the read control unit 10 turns on the lamp 1L. In addition, the read control unit 10 controls drive (operation) of the image sensor 15. When reading a document, the read control unit 10 operates the image sensor 15. In addition, the read control unit 10 is connected to the first image processing unit 16 so as to control operation of the first image processing unit 16.

The first image processing unit 16 generates image data based on an output of the image sensor 15 and further performs image processing on the generated image data. Note that in this embodiment, there is described an example in which the first image processing unit 16 is disposed in the image reading unit 1 while the second image processing unit 63 is disposed in the main control unit 6a. However, only one image processing unit may be disposed, and hence the only one image processing unit may perform the process of the first image processing unit 16 and the process of the second image processing unit 63.

The image sensor 15 receives light from the document and outputs three types of (R, G, and B) analog electric signals for each pixel. Further, the first image processing unit 16 includes an image data generating unit 17 for generating image data based on an analog output of the image sensor 15. Specifically, the image data generating unit 17 includes an A/D converter unit 171 and a correction unit 172. The A/D converter unit 171 receives a transferred analog electric signal of each pixel obtained by the image sensor 15, converts it into a digital signal by quantization. For instance, the A/D converter unit 171 performs eight-bit quantization for each of the R, G, and B signal (i.e., total 24-bit quantization).

The correction unit 172 corrects distortion of the image data due to each unit of the image reading unit 1 such as characteristics of the lamp 1L and the image sensor 15, as gamma correction, shading correction, and the like. Further, the image data processed by the first image processing unit 16 is stored in an image memory 18. The image memory 18 sequentially transfers the image data to the storage unit 62 (main control unit 6a) by a constant number of lines in the main scanning direction (or by a page or by a band). The second image processing unit 63 performs image processing necessary for the job on the image data stored in the storage unit 62. Further, using the image data after the processing, printing, transmission, or the like is performed.

(Mixed Setting Mode)

Next, with reference to FIGS. 2, 4, and 5, an example of document reading in the mixed setting mode is described. FIG. 5 is an explanatory diagram of document reading in the mixed setting mode.

The multifunction peripheral 1000 (image reading device 100) of this embodiment can read set document sheets so as to generate image data having sizes corresponding to document sizes even if the document sheets set on the document tray 21 of the document feeder unit 2 have different sizes.

When reading in the mixed setting mode in which a plurality of document sheets having different sizes are set on the document feeder unit 2 of the document tray 21 and the document sheets are fed and read one by one, the user makes setting to the operation panel 3 for reading the document sheets in the mixed setting mode. In other words, the operation panel 3 accepts a document read instruction in the mixed setting mode. When the reading in the mixed setting mode is set, the main control unit 6a informs the feed control unit 20 and the read control unit 10 of the setting.

Next, with reference to FIG. 5, cases of the mixed setting of document sheets are described. The mixed setting mode of the image reading device 100 (multifunction peripheral 1000) of this embodiment supports the case where document sheets having the same size (width) in the main scanning direction and different sizes in the sub-scanning direction (the document feed direction) are mixedly set (i.e., same width mixed setting), and the case where document sheets having different sizes in the main scanning direction and different sizes in the sub-scanning direction (the document feed direction) are mixedly set (i.e., different width mixed setting).

Figure 5A:
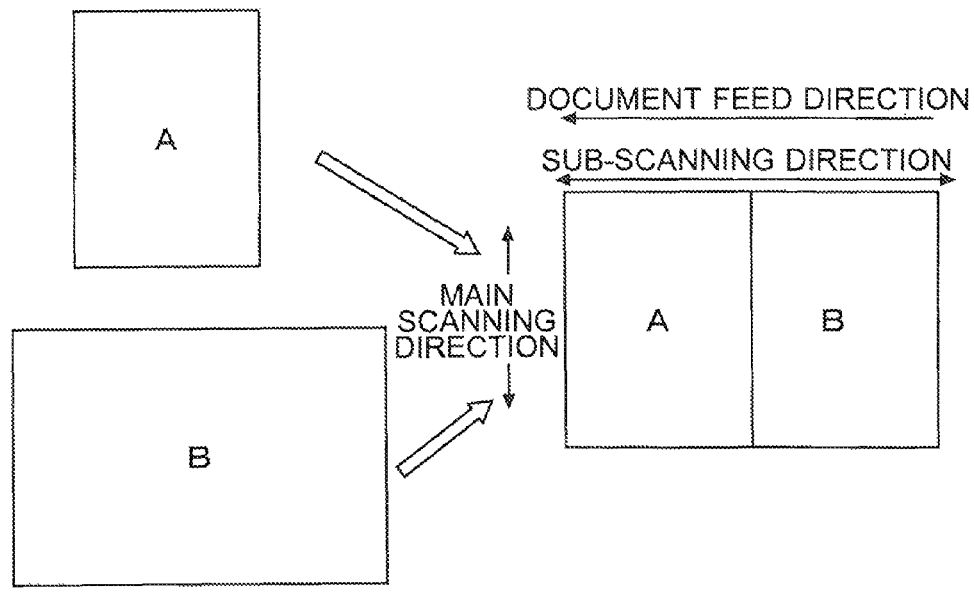
FIG. 5A is a diagram showing document reading in same width mixed setting.

Further, FIG. 5A shows an example of the case of the same width mixed setting. In FIG. 5A, A shows a document sheet having a smaller size in the sub-scanning direction, while B shows a document sheet having a larger size in the sub-scanning direction. As combinations of the same width mixed setting that can be set on the document tray 21 of the document feeder unit 2, for example, there are a combination of Ledger size and Letter size, a combination of Legal size and Letter-R size, a combination of B5 portrait size and B4 landscape size, a combination of A4 portrait size and A3 landscape size, a combination of A4 landscape size and Folio size, and the like.

Figure 5B:
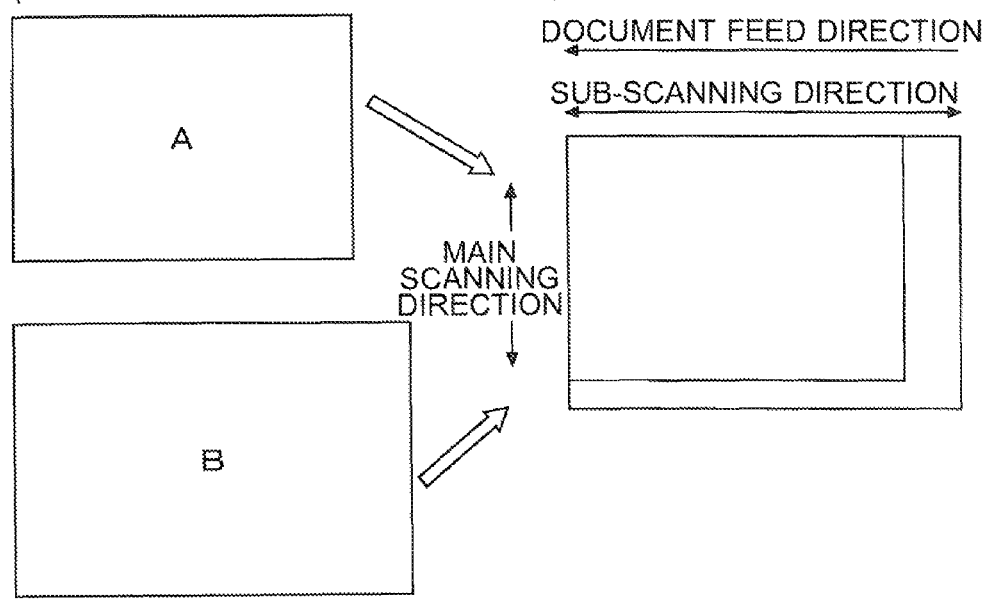
FIG. 5B is a diagram showing document reading in different width mixed setting.

FIG. 5B shows an example of the case of the different width mixed setting. In FIG. 5B, sheet A is a smaller document sheet, while sheet B is a larger document sheet. As combinations of the different width mixed setting that can be set on the document tray 21 of the document feeder unit 2, for example, there are a combination of Ledger size, Letter size, and Legal size, a combination of B5 size, B4 size, A4 size and A3 size, a combination of A4 size, B5 size and Folio size, and the like.

When document sheets having different sizes are mixedly set on the document tray 21, using the document size sensor 26, the feed control unit 20 can detects a size in the main scanning direction of a document sheet having a largest size in the main scanning direction among the document sheets set on the document tray 21.

Further, the feed control unit 20 informs the read control unit 10 of the size in the main scanning direction of the document sheet having the largest size in the main scanning direction. When reading in the mixed setting mode, a size of the document sheet to be read cannot be detected at read start timing. Therefore, it is necessary to read from an end to the other end of the document sheet both in the main scanning direction and in the sub-scanning direction. Therefore, the read control unit 10 controls the image sensor 15 to read a size in the sub-scanning direction of a regular size paper sheet having a largest size in the sub-scanning direction among regular size paper sheets having the informed size in the main scanning direction. For instance, when the size in the main scanning direction detected by the document size sensor 26 matches a long side of the A4 size or a short side of the A3 size, the read control unit 10 controls to read the document sheet as the A3 size. In addition, the feed control unit 20 rotates the document feed roller 22 at timing when reading a document sheet having a largest size in the sub-scanning direction. Further, when reading in the mixed setting mode, the read control unit 10 or the feed control unit 20 may control the image sensor 15 and the like to read a largest readable size.

Because there are the case of the same width mixed setting and the case of the different width mixed setting, when reading in the mixed setting mode, it is necessary to determine the size of each read document sheet both in the sub-scanning direction and in the main scanning direction. Further, when setting the mixed setting mode by the operation panel 3, it is possible to permit to set one of the same width mixed setting and the different width mixed setting. In this case, when the same width mixed setting is set, a size of document sheets in the main scanning direction can be recognized by the document size sensor 26.

A size determination unit 7 of the first image processing unit 16 performs a process of determining a size of document sheets. For instance, the size determination unit 7 is a circuit including a calculation circuit and a storage circuit. However, the size determination unit 7 may be realized by software with the CPU and the memory of the read control unit 10.

In the mixed setting mode, the size determination unit 7 determines a size of each read document sheet in the sub-scanning direction. Various methods can be used for determining a size of the document sheet in the sub-scanning direction. For instance, a speed of feeding the document sheet (i.e., document feed amount per unit time) is determined in advance. Therefore, the size determination unit 7 may determine the size of the document sheet in the sub-scanning direction by multiplying the speed of feeding the document sheet by the time after the document detection sensor 28 detects arrival of the front end of the document sheet until detecting passing of the rear end of the document sheet (i.e., time period during detection of the document sheet).

For instance, the size determination unit 7 may determine the size of the document sheet in the sub-scanning direction based on the image data obtained by reading by the image sensor 15. For instance, the front end part and the rear end part in the sub-scanning direction of the document sheet may appear as bars (or edges) extending in the main scanning direction in the image data. In the image data, pixels at positions corresponding to the front end and the rear end in the sub-scanning direction of the document sheet have pixel values that are different from a pixel value of background of the document sheet and may be within a certain range of pixel values. Therefore, in the image data, the front end and the rear end in the sub-scanning direction may appear as lines having substantially uniform pixel values extending in the main scanning direction (such as a gray color line; in addition, the size determination unit 7 may determine a pixel value of the background by a histogram or the like). Then, the size determination unit 7 recognizes the front end part and the rear end part in the sub-scanning direction of the document sheet in the image data, and may determine the size of the document sheet in the sub-scanning direction in accordance with the interval (i.e., the number of lines) between the front end and the rear end.

In the mixed setting mode, the size determination unit 7 determines a size in the main scanning direction of each read document. There are various methods for determining a size in the main scanning direction of the document. For instance, a plurality of (e.g., approximately four to ten) main scanning detection sensors 29 (see FIG. 2 and FIG. 4; e.g., photosensors) for detecting presence or absence of the document are disposed along the main scanning direction (perpendicular to the document feed direction). Further, the size determination unit 7 determines a regular size based on a sensor detecting the document sheet among the main scanning detection sensors 29 and a determined document size in the sub-scanning direction. Then, a main scanning direction size of the determined regular size is determined as the main scanning direction size of the document.

For instance, the size determination unit 7 may determine the main scanning direction size of the document based on the image data obtained by reading by the image sensor 15. For instance, end parts of the document in the main scanning direction may appear as bars (or edges) extending in the sub-scanning direction. Pixels at positions corresponding to the end parts in the main scanning direction of the document (i.e., pixels at boundary positions) have pixel values that are different from those of background of the document sheet and may be within a certain range of pixel values. Therefore, in the image data, the ends in the main scanning direction may appear as lines having substantially uniform pixel values extending in the sub-scanning direction (such as a gray color line). Then, the size determination unit 7 recognizes the end parts in the main scanning direction of the document sheet in the image data, and may determine the main scanning direction size of the document sheet in accordance with the interval between the ends.

In this way, the size determination unit 7 determines the main scanning direction size and the sub-scanning direction size of each page of the read document. Then, in the mixed setting mode, the size determination unit 7 controls the storage unit 62 and the image memory 18 to discard an unnecessary part (outside the determined size; i.e., an extra part) in the image data of each page in accordance with the determined document size. In this way, the size determination unit 7 processes the image data (i.e., adjusts the size) obtained by reading so as to generate the image data adjusted to the read document size.

(Blank Sheet Detection and Blank Sheet Deletion)

Figure 6:
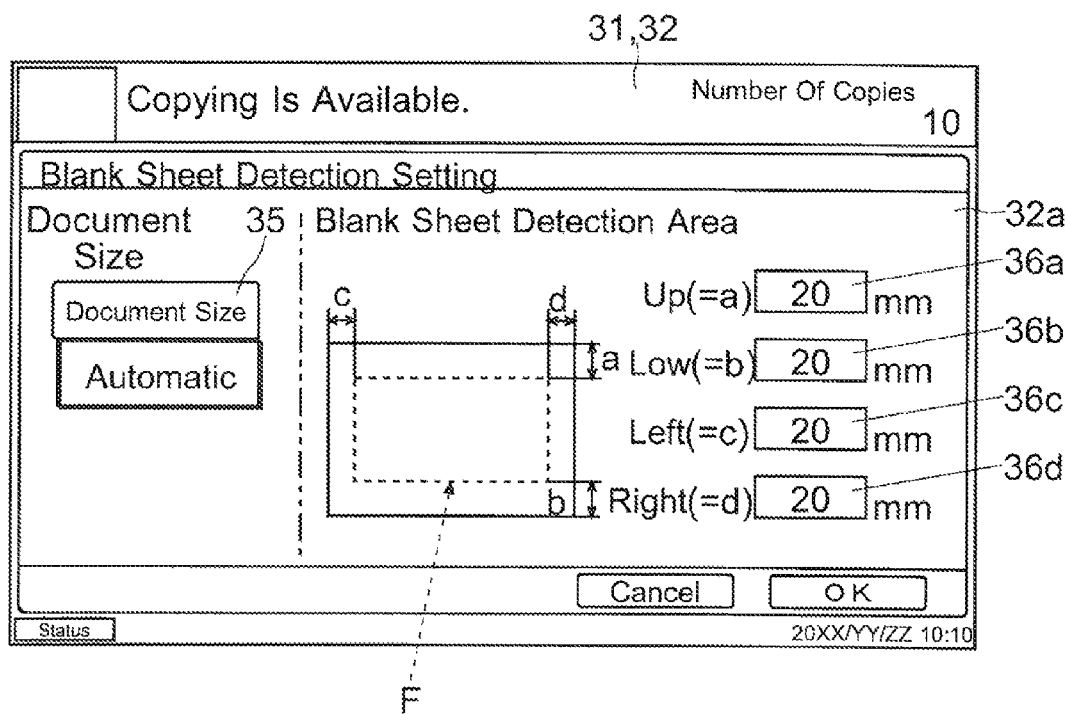
FIG. 6 is a diagram showing an example of a blank sheet deletion setting screen.
Figure 7:
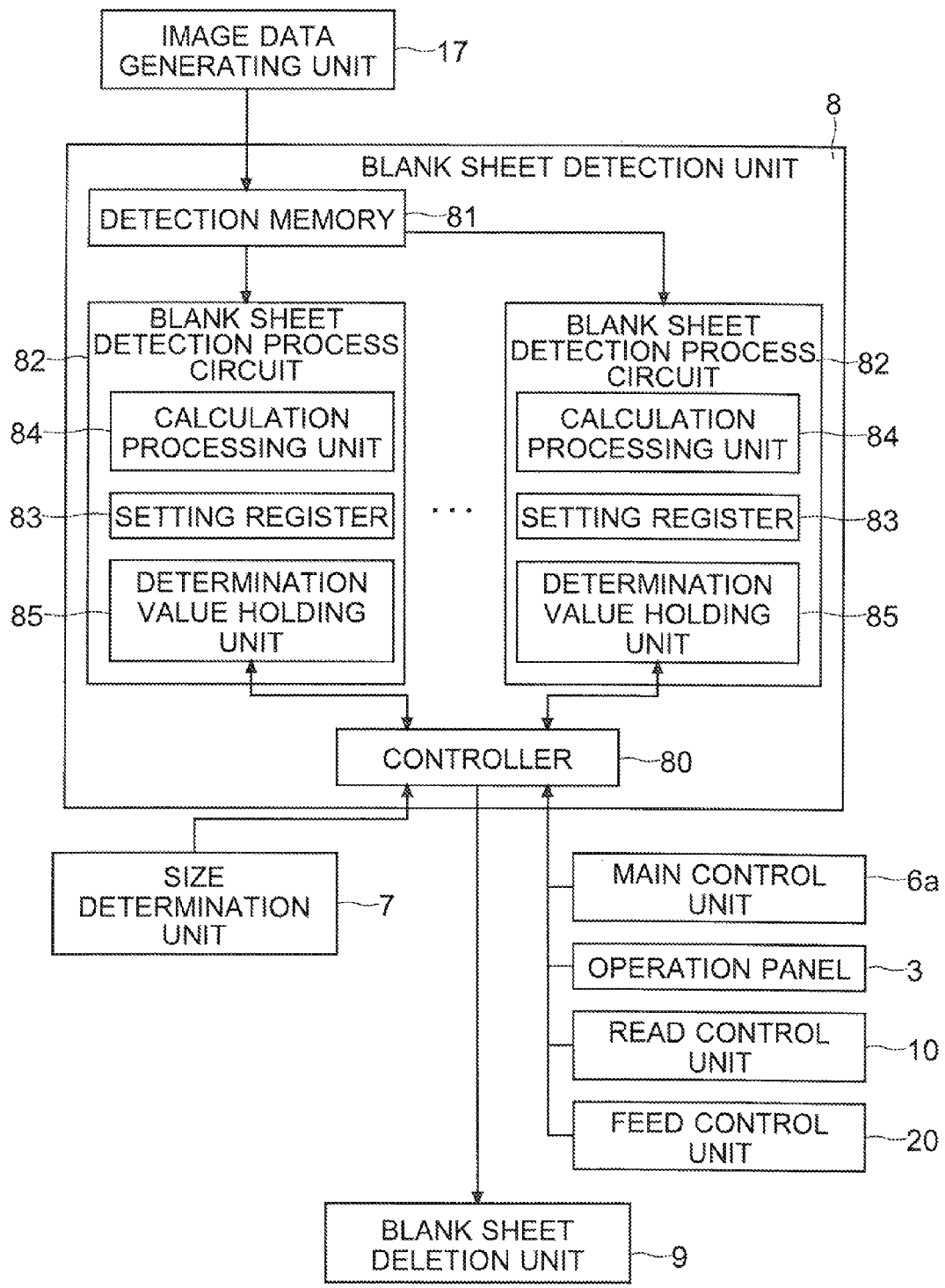
FIG. 7 is a block diagram showing an example of a blank sheet detection unit.

Next, with reference to FIG. 6 and FIG. 7, an example of a blank sheet detection process and a blank sheet deletion process by the image reading device 100 (multifunction peripheral 1000) of this embodiment is described. FIG. 6 is an explanatory diagram showing an example of a blank sheet deletion setting screen 32*a*. FIG. 7 is a block diagram showing an example of a blank sheet detection unit 8.

A blank sheet may be mixed into document sheets. Printing or transmission of the blank sheet is wasteful. Therefore, the image reading device 100 (multifunction peripheral 1000) of this embodiment performs a blank sheet detection process in which the blank sheet detection unit 8 detects a blank page among document image data obtained by reading. Further, a blank sheet deletion unit 9 deletes the image data of the detected blank page so as not to be used for the job. The blank sheet detection unit 8 is an ASIC or a part of an ASIC. However, the blank sheet detection unit 8 is not limited to this structure.

First, with reference to FIG. 6, setting of the blank sheet detection process is described. Concerning a job accompanying document reading (such as copying and transmission of image data obtained by scanning), the operation panel 3 accepts setting of a document size and an area for performing the blank sheet detection process in the one page document (blank sheet detection area F).

Specifically, the user operates the operation panel 3 so as to display the blank sheet deletion setting screen 32*a* as shown in FIG. 6 on the liquid crystal display unit 32. In the blank sheet deletion setting screen 32*a*, a size of a document sheet set on the document tray 21 and a position and size of the blank sheet detection area F can be set.

The blank sheet deletion setting screen 32*a* is provided with a document size key 35. The user touches a display position of the document size key 35 so as to set a size of a document sheet set on the document tray 21 (such as a letter size or the A4 size). Further, it is possible to select an item "auto" in which the image reading device 100 automatically determine a document size. When "auto" is set and the document reading is started, the read control unit 10 controls the size determination unit 7 to determine the document size.

In addition, in the blank sheet deletion setting screen 32*a*, it is possible to set an area (blank sheet detection area F) for performing the blank sheet detection process. In the example shown in FIG. 6, it is possible to set a range (area) that is not regarded as the blank sheet detection area F from the entire one page area of the document sheet. For this setting, the blank sheet deletion setting screen 32*a* is provided with distance input boxes 36*a*, 36*b*, 36*c*, and 36*d* for inputting distances from the upper end, lower end, left end, and right end of the part that is not regarded as the blank sheet detection area F of the document sheet. The user touches one of display positions of the distance input boxes 36*a* to 36*d* to which set values are to be set, and inputs numerals by the ten-key unit 33 or the like so as to set the distances from the ends of the document sheet. In this way, the operation panel 3 accepts input of determining distances from the ends of the document sheet in the document sheet (page) as the input of setting a size and position of the blank sheet detection area F in one page of the document sheet. Further, in the blank sheet detection process, the inside area defined by the set distances from the ends of the document sheet is regarded as the blank sheet detection area F.

Next, with reference to FIG. 7, an example of the blank sheet detection process on the blank sheet detection area F is described.

First, the image data generated by the image data generating unit 17 is supplied to a detection memory 81 in the blank sheet detection unit 8 (or outside the blank sheet detection unit 8). The detection memory 81 stores image data of a predetermined number of lines (band unit). The number of bands in one-page image data depends on the document size and can be a few to a few tens, for example. Therefore, the image data is handled by a plurality of units obtained by dividing along the sub-scanning direction (having a constant length in the sub-scanning direction). Further, it is possible to configure that the detection memory 81 is supplied with image data of one line in the main scanning direction, and a blank sheet detection process circuit 82 performs the blank sheet detection process by one line.

Then, the blank sheet detection process circuit 82 is disposed in the blank sheet detection unit 8. The blank sheet detection process circuit 82 is a circuit for detecting whether or not the blank sheet detection area F in one-page document image data is blank. Further, the image reading device 100 (multifunction peripheral 1000) of this embodiment includes a plurality of the blank sheet detection process circuits 82.

In addition, the blank sheet detection unit 8 includes a controller 80 for controlling operations of various circuits in the blank sheet detection unit 8. Further, it is possible to configure that the read control unit 10 controls operation of the blank sheet detection process circuit 82 in the blank sheet detection unit 8.

The blank sheet detection process circuit 82 includes a setting register 83 for storing set values indicating main scanning direction length (main scanning width S1) and position of the blank sheet detection area F. The controller 80 sets the set values in the setting register 83 in accordance with data given by the read control unit 10, the feed control unit 20, and the main control unit 6a.

In case of not the mixed setting mode, the controller 80 receives data indicating a main scanning direction size of the document sheet detected by the feed control unit 20 from the feed control unit 20 or the read control unit 10. In addition, the controller 80 receives from the main control unit 6a the data indicating the document size set value and distances from the upper, lower, left, and right ends of the document sheet for excluding from the blank sheet detection area F set in the blank sheet deletion setting screen 32a. Then, the controller 80 sets the data indicating the width (i.e., the main scanning width S1) and the position (from the ends of the document sheet) to be the blank sheet detection area F in the main scanning direction in the document image data to the setting register 83 as the set values. In other words, the controller 80 sets the set value indicating the part to be regarded as the blank sheet detection area F and the part not to be regarded as the blank sheet detection area F (in which the blank sheet detection process is not performed) in the main scanning direction in the image data to the setting register 83.

In addition, in the case of not the mixed setting mode, the controller 80 may receive data indicating the document size set by the operation panel 3 from the main control unit 6a or the like. Further, the controller 80 may set the width (sub-scanning width S2) and positions (from the ends of the image data) to be the blank sheet detection area F in the sub-scanning direction in the document image data as the set values in the setting register 83 based on the set document size. In other words, the controller 80 may set the set values indicating the part to be regarded as the blank sheet detection area F and the part not to be regarded as the blank sheet detection area F (in which the blank sheet detection process is not performed) in the sub-scanning direction in the image data to the setting register 83.

Further, a calculation processing unit 84 in the blank sheet detection process circuit 82 detects whether or not the blank sheet detection area F in the band is blank for each band of the one page document based on the set values in the setting register 83. For instance, the calculation processing unit 84 counts the number of pixels (the number of dots) having pixel values larger than a predetermined pixel value among pixels in the part corresponding to the blank sheet detection area F in the band. Then, the calculation processing unit 84 determines the blank sheet detection area F in the band is not blank in case where the number of pixels having pixel values larger than the predetermined pixel value is larger than a predetermined threshold value, while it determines the blank sheet detection area F in the band is blank in case where the number of pixels is the predetermined threshold value or smaller.

Note that the predetermined pixel value may be determined on the basis of a pixel value when a white paper sheet is read or may be determined as an average pixel value of background color of the document sheet. In addition, the predetermined threshold value may be determined on the basis of the number of dots with toner when there is one or a few characters.

Further, a detection result of the blank sheet detection area F in one band of the calculation processing unit 84 (i.e., a determination value; for example, "0" in case of blank and "1" in case of not blank) is stored in a determination value holding unit 85. The determination value holding unit 85 stores the determination value of each band by the calculation processing unit 84. Alternately, it is possible to configure that the determination value holding unit 85 calculates and updates the determination value for each band, and holds an integrated value of the determination value at time point a plurality of bands before the band for which the blank sheet detection process is currently performed.

Since before one page reading of the document is completed, the blank sheet detection process circuit 82 repeats the detection whether or not the page is blank by line unit (by unit of one line or a plurality of lines, or by band unit) in the main scanning direction of the image data, based on the image data in the blank sheet detection area F on which the blank sheet detection is performed in the image data obtained by the document reading by the image reading unit 1.

Further, after the blank sheet detection process is performed on the last band including the blank sheet detection area F in the sub-scanning direction in one page, the controller 80 checks the detection result held by the determination value holding unit 85. Then, in case where the determination value holding unit 85 holds a value (detection result) indicating that all bands including the blank sheet detection area F are blank, the controller 80 detects that the document sheet is a blank sheet, while it detects that the document sheet is not a blank sheet in case where the determination value holding unit 85 holds a value indicating that at least one of the bands is not blank.

When detecting that the document sheet is a blank sheet, the blank sheet detection unit 8 (controller 80) permits the blank sheet deletion unit 9 to delete the document image data of the detected blank sheet. In order not to use for the job, the blank sheet deletion unit 9 deletes (i.e., removes or discards) the image data of the detected blank page from the image memory 18 or the storage unit 62.

(Flow of Blank Sheet Detection in Mixed Setting Mode)

Next, with reference to FIG. 8 and FIG. 9, an example of flow of the blank sheet detection in the mixed setting mode is described. FIG. 8 is an explanatory diagram showing that a main scanning direction width (main scanning width S1) and a sub-scanning direction width (sub-scanning width S2) of the blank sheet detection area F are different for individual document sizes. FIG. 9 is a flowchart showing an example of flow of the blank sheet detection in the mixed setting mode.

First, with reference to FIG. 8, there is described that the main scanning width S1 and the sub-scanning width S2 of an appropriate blank sheet detection area F are different corresponding to document sizes.

As described above, in the image reading device 100 (multifunction peripheral 1000) of this embodiment, it is possible to set the inside area defined by the set distances from ends of the document sheets as the blank sheet detection area F. Therefore, the main scanning width S1 and the sub-scanning width S2 of the blank sheet detection area F may differ depending on the document size.

FIG. 8 shows document sheets of the A3 landscape size, the A4 portrait size, and the B4 landscape size. In each size, solid lines with arrows on both ends indicate the main scanning width S1 and the sub-scanning width S2, which are obtained by subtracting predetermined distances from the upper, lower, left and right ends from the side lengths of the document sheet. Note that in the following description, the set distances from the upper, lower, left and right ends of the paper sheet are the same for individual document sizes.

In a relationship between the A3 landscape size and the A4 portrait size, the main scanning direction size is the same, and the appropriate main scanning width S1 of the blank sheet detection area F is also the same. However, because the main scanning direction size is different between the A3 landscape size (A4 portrait size) and the B4 landscape size, the appropriate main scanning width S1 corresponding to the set distance is different. In addition, because the sub-scanning direction size is different, the sub-scanning width S2 of the appropriate blank sheet detection area F corresponding to the set distances is also different among the A3 landscape size, the A4 portrait size, and the B4 landscape size.

Figure 10A:
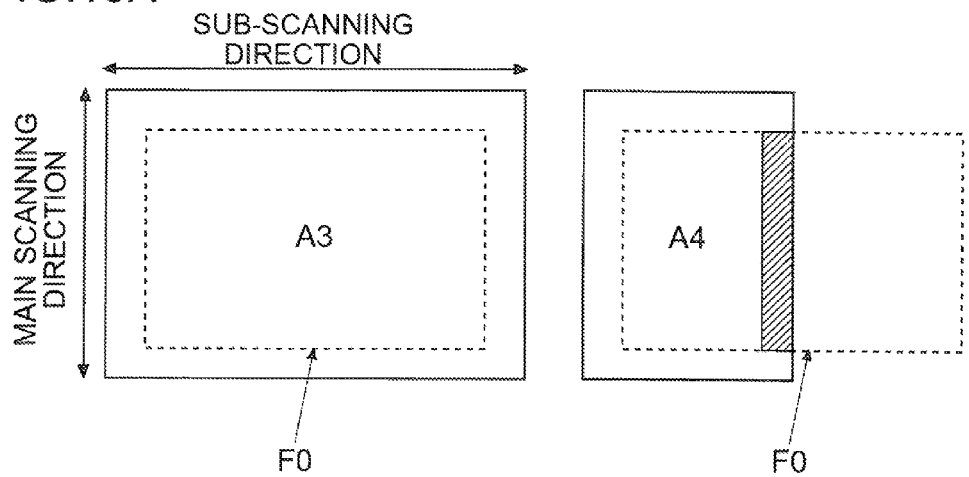
FIG. 10A is a diagram showing an example of a case where a problem of accuracy of the blank sheet detection occurs in the document mixed setting.
Figure 10B:
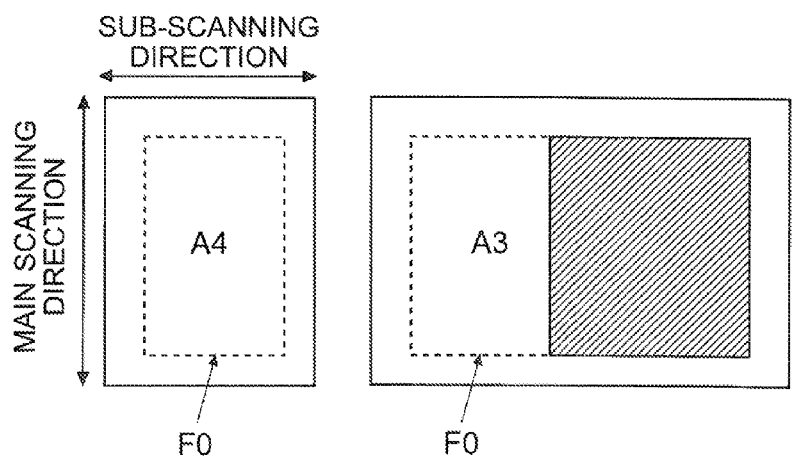
FIG. 10B is a diagram showing another example of the case where a problem of accuracy of the blank sheet detection occurs in the document mixed setting.
Figure 10C:
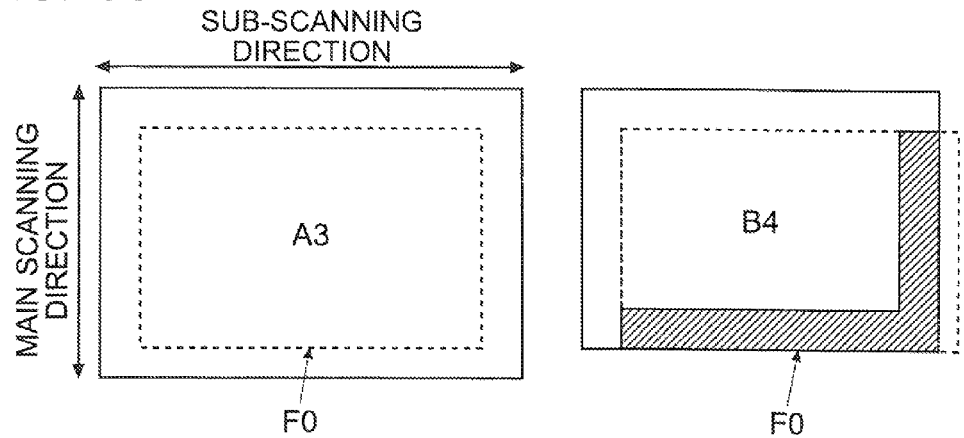
FIG. 10C is a diagram showing still another example of the case where a problem of accuracy of the blank sheet detection occurs in the document mixed setting.

However, as described above with reference to FIG. 10, the main scanning width S1 of the blank sheet detection area F in the blank sheet detection process (the document size that can be set) is only one pattern. Further, in the mixed setting mode in which the document sizes are not only one, the document sizes are not determined at read start timing and are determined when one page reading is completed. Further, there is a problem that the blank sheet detection area F cannot be set appropriately when the blank sheet detection process is performed on the basis of the main scanning direction line by the band unit (of a certain number of lines in the main scanning direction) since before completion of the document reading of one page (from halfway of the document reading) in reading in the mixed setting mode. For instance, there is a case where despite that the document size under being read is the A4 size, the blank sheet detection process is performed based on the blank sheet detection area F for the A3 size. Then, the blank sheet detection process may not be performed correctly.

In addition, when the blank sheet detection process is performed on the entire one-page image data after the document reading of one sheet is finished so that the document image data of one page is completed, the process speed of the blank sheet detection is inevitably decreased.

Therefore, in reading in the mixed setting mode of this embodiment, the blank sheet detection unit 8 performs the blank sheet detection process on each band by the main scanning width S1 of a plurality of effective image regions. When the document size is determined, the blank sheet detection unit 8 determines whether or not the blank sheet detection area F is blank based on a detection result of the blank sheet detection process in the main scanning width S1 corresponding to the determined main scanning direction size of the document size.

Because the blank sheet detection unit 8 has to perform the blank sheet detection process in a plurality of patterns, the blank sheet detection unit 8 may include a plurality of the blank sheet detection process circuits 82 (see FIG. 7). The blank sheet detection unit 8 may include two blank sheet detection process circuits 82, or three or more blank sheet detection process circuits 82. In addition, in order to support any size, the blank sheet detection process circuits 82 may be disposed by the number corresponding to the number of the main scanning width types of the regular sizes of the document sheets that can be set in the mixed setting mode. Further, the read control unit 10 and the controller 80 control the corresponding blank sheet detection process circuit 82 in the mixed setting mode.

Next, with reference to FIG. 9, a flow of the blank sheet detection process in the mixed setting mode is described. The flow of FIG. 9 starts when the document reading is started by pressing the start key 34 after setting of the reading in the mixed setting mode and setting of performing the blank sheet detection and the blank sheet deletion by the operation panel 3.

First, the read control unit 10 controls the controller 80 to set data indicating the main scanning width S1 of the blank sheet detection area F and the position of the main scanning width S1 as the set values in the setting register 83 of each blank sheet detection process circuit 82 (Step #1). In this case, the main scanning width S1 set in each setting register 83 is different depending on a type of the document size (Step #1). The main scanning width S1 of the blank sheet detection area F corresponding to the size of the long side of the A4 size or the short side of the A3 size (main scanning direction size) may be set in the setting register 83 of a certain blank sheet detection process circuit 82. The main scanning width S1 of the blank sheet detection area F corresponding to the size of the short side of the B4 size or the long side of the B5 size (main scanning direction size) may be set in the setting register 83 of another blank sheet detection process circuit 82.

In addition, a set value corresponding to an inch system size may be set in the setting register 83 of the blank sheet detection process circuit 82. For instance, the main scanning width S1 of the blank sheet detection area F corresponding to the size of the short side of the Letter size or the short side of the Legal size (main scanning direction size) may be set in the setting register 83 of a certain blank sheet detection process circuit 82. The main scanning width S1 of the blank sheet detection area F corresponding to the size of the short side of the Ledger size or the long side of the Letter size (main scanning direction size) may be set in the setting register 83 of another blank sheet detection process circuit 82. In addition, the main scanning width S1 of the blank sheet detection area F corresponding to the size of the short side of the Folio size or the short side of the A4 size (main scanning direction size) may be set in the setting register 83 of another blank sheet detection process circuit 82.

Specifically, the blank sheet detection unit 8 changes the length of the main scanning width S1 of the blank sheet detection area F in accordance with the document size so that the inside area defined by the distances from ends of the document sheet becomes the blank sheet detection area F. In addition, the blank sheet detection unit 8 regards the inside area defined by the distances set by the operation panel 3 from the ends of the document size determined by the size determination unit 7 to be the sub-scanning width S2 of the blank sheet detection area F. Further, the blank sheet detection unit 8 detects whether or not the page is blank based on the detection result in the range of the main scanning width S1 and the sub-scanning width S2 (i.e., the blank sheet detection area F). In this way, in any size of the document size, the inside area defined by distances from the ends of the document sheet set by the operation panel 3 is regarded as the blank sheet detection area F, and the controller 80 of the blank sheet detection unit 8 commonly uses the distances set by the operation panel 3 in any document size.

Then, the document reading is performed (Step #2). In this case, the feed control unit 20 controls the document feed motor 2*m* and the like, so as to feed one document sheet on the document tray 21 to the read position (i.e., the feed reading contact glass 11*a*). In addition, the read control unit 10 operates the image sensor 15, the first image processing unit 16, and the like, so as to perform the document reading by line unit in the main scanning direction from the front end of the document sheet. In addition, because the document size is not fixed in the mixed setting mode, the read control unit 10 reads the document in the largest readable size, for example, or in the largest regular size among the main scanning direction sizes detected by the size detection sensor.

Further, the blank sheet detection unit 8 performs the blank sheet detection process of the image data by band unit since before one page document reading is completed (Step #3). Further, when the blank sheet detection process of the band is completed, the detection result (determination value) of the band of the blank sheet detection is stored in the determination value holding unit 85 (Step #4). Further, in case where a first band or a plurality of first bands of the document sheet (the front end part) are outside the blank sheet detection area F, the blank sheet detection process circuit 82 does not perform the blank sheet detection process even if image data of a band outside the blank sheet detection area F is input, and the detection result is not stored.

Further, document reading of one page (in the largest readable size, for example) is completed (Step #5). Then, the size determination unit 7 determines the main scanning direction size and the sub-scanning direction size of the document based on the output of the document detection sensor 28 or the image data (Step #6).

Further, the controller 80 of the blank sheet detection unit 8 recognizes the main scanning width S1 and the sub-scanning width S2 of the blank sheet detection area F based on the determined document size (Step #7). Then, the controller 80 of the blank sheet detection unit 8 selects the detection result of the blank sheet detection process in which the blank sheet detection process is performed by the determined main scanning width S1 (the blank sheet detection process circuit 82 that has performed the blank sheet detection process by the set value in the setting register 83 corresponding to the determined main scanning width S1) (Step #8). In other words, when performing the reading in the mixed setting mode by input to the operation panel 3, the blank sheet detection unit 8 performs the blank sheet detection process by a plurality of the main scanning widths S1 of the blank sheet detection areas F corresponding to a plurality of document sizes, and detects whether or not the page is blank by using the detection result by the main scanning width S1 corresponding to the main scanning direction size of the document determined by the size determination unit 7 among the detection results of the different main scanning widths S1 of the blank sheet detection areas F.

Further, the controller 80 of the blank sheet detection unit 8 determines the band included in the range of the determined sub-scanning width S2 among the bands of the one-page document image data (Step #9), in order to exclude the bands outside the blank sheet detection area F (the bands in the front end part and the rear end part in the sub-scanning direction).

Next, the controller 80 of the blank sheet detection unit 8 detects whether or not the blank sheet detection area F is blank based on each detection result (determination value) of the blank sheet detection process of the bands included in the determined sub-scanning width S2 (in the blank sheet detection area F) (Step #10). In other words, when performing the reading in the mixed setting mode, the blank sheet detection unit 8 detects whether or not the page is blank based on the detection result in the range of the sub-scanning width S2 of the blank sheet detection area F corresponding to the size of the document sheet in the sub-scanning direction determined by the size determination unit 7 in the one-page document image data. For instance, on the detection result stored in the determination value holding unit 85, the controller 80 detects that the blank sheet detection area F is not blank in case where there is at least one band that is determined not to be blank in the blank sheet detection area F, while it detects that the blank sheet detection area F is blank in case where there is no band that is determined not to be blank.

In case where the blank sheet detection area F is blank (Yes in Step #11), based on information from the blank sheet detection unit 8, the blank sheet deletion unit 9 deletes the data of the page of which the blank sheet detection area F is detected as blank from the storage unit 62 or the image memory 18 so that the data is not used for the job (Step #12).

On the other hand, in case where the blank sheet detection area F is not detected as blank (No in Step #11) or after Step #12, the read control unit 10 checks whether or not all the document sheets set on the document tray 21 have been read (Step #13). For instance, when it is detected by the set detection sensor 27 that there is no document sheet on the document tray 21, the read control unit 10 determines that all the document sheets have been read.

When all the document sheets have been read in the mixed setting mode (Yes in Step #13), the flow is finished (END). On the other hand, in case where there is a remaining document sheet to be read (No in Step #13), the controller 80 resets the detection result stored in each determination value holding unit 85 (Step #14). Further, the flow returns to Step #2, in which next document reading, the blank sheet detection process, and the like are performed.

In this way, the image reading device 100 according to this embodiment includes the image reading unit 1 for reading a document, the document feeder unit 2 for feeding set document sheets one by one to the read position of the image reading unit 1, the setting input unit (operation panel 3) for accepting the document read instruction in the mixed setting mode in which a plurality of document sheets having different sizes are set on the document feeder unit 2 and are read, the size determination unit 7 for determining a size of each page of the document read by the image reading unit 1, the blank sheet detection unit 8 configured to repeat the whether or not the blank sheet detection area in image data for performing blank sheet detection F is blank since before one page reading of the document is completed, by line unit in the main scanning direction of the image data obtained by reading the document, and in case of reading in the mixed setting mode, to detect whether or not the document sheet is a blank sheet based on a detection result in the sub-scanning width range in the blank sheet detection area F corresponding to the size of the document sheet in the sub-scanning direction determined by the size determination unit 7 in one-page document image data, and the blank sheet deletion unit 9 for deleting image data of the document sheet whose blank sheet detection area F is detected as blank, so that the image data is not used for a job.

In this way, because of the document mixed setting, even if sizes of the document sheets in the sub-scanning direction are not the same (even in the document mixed setting) in one job, it is possible to correctly detect whether or not the read document page is blank. In addition, because it is promptly determined whether or not it is blank when a document size in the sub-scanning direction is determined, it is possible to promptly detect the document sheet is a blank sheet. In addition, without waiting for completion of image data of one page, the blank sheet detection process is performed sequentially for parts of the one-page image data during the document reading. When generation of the one-page image data is completed, the blank sheet detection process is almost finished. Further, when the document size is determined, it is determined whether or not the document sheet is a blank sheet. Therefore, compared with the case where the blank sheet detection is started after generation of the one-page image data is completed, it is possible to shorten a time until it is determined whether or not the document sheet is a blank sheet, and hence high-speed blank sheet detection can be realized. In addition, unlike the conventional structure, it is not necessary to decrease the document feeding speed for the process of the blank sheet detection. In addition, it is also not necessary to dispose a large-capacity buffer memory.

In addition, the size determination unit 7 determines the main scanning direction size of each page of the document sheets, and when reading in the mixed setting mode, the blank sheet detection unit 8 performs in parallel the blank sheet detection process in the main scanning widths S1 of the plurality of blank sheet detection areas F corresponding to the plurality of document sizes. The blank sheet detection unit 8 uses the detection result in the main scanning width S1 corresponding to the main scanning direction size of the document sheet determined by the size determination unit 7 among the detection results of the different main scanning widths S1 of the blank sheet detection areas F, so as to detect whether or not the document sheet is a blank sheet. Because of the document mixed setting, even if the sizes of the document sheets in the main scanning direction are not the same in one job, one of the plurality of main scanning widths S1 corresponds to the document size under being read. Further, because it is detected whether or not the document sheet (blank sheet detection area F) is blank based on the process result of the blank sheet detection in the main scanning width S1 of the appropriate blank sheet detection area F corresponding to the main scanning direction size of the determined document sheet among the plurality of main scanning widths S1, it is possible to correctly perform the blank sheet detection even in the case of the document mixed setting.

In addition, the setting input unit (operation panel 3) accepts the input specifying the distances from ends of the document sheet in the document sheet as the input for setting the size and position of the blank sheet detection area F in one page of the document. The blank sheet detection unit 8 regards the inside area defined by the set distances from the ends in the sub-scanning direction of the document size determined by the size determination unit as the sub-scanning width S2 of the blank sheet detection area F, and detects whether or not the document sheet is a blank sheet based on the detection result in the range of the sub-scanning width S2. Further, the blank sheet detection unit 8 sets different lengths in the main scanning width S1 of the blank sheet detection area F in accordance with the document size, so that the inside area defined by the distances from the ends in the main scanning direction of the document size determined by the size determination unit becomes the blank sheet detection area F.

In this way, because of the document mixed setting, even if the document sheets have a plurality of main scanning direction sizes in one job, certain margins are always secured in the main scanning direction, so that the area between the margins in the main scanning direction becomes the blank sheet detection area F. Therefore, regardless of the document size, the appropriate blank sheet detection area F can be determined. Therefore, in the reading job, because of the document mixed setting, even if the document sheets have a plurality of main scanning direction sizes in one job, it is possible to correctly detect whether or not each page of the document is blank. In addition, because of the document mixed setting, even if the document sheets have a plurality of sizes in the sub-scanning direction in one job, certain margins are always secured in the sub-scanning direction, and the appropriate blank sheet detection area F can be determined so that the area between the margins in the sub-scanning direction becomes the blank sheet detection area F. Therefore, because of the document mixed setting, even if the document sheets have a plurality of sizes in the sub-scanning direction in the reading job, it is possible to correctly detect whether or not each page of the document is blank.

Further, in this embodiment, there is described the case where the blank sheet detection area F is set as the inside area defined by the set distances from the ends in the sub-scanning direction and in the main scanning direction of the document size determined by the size determination unit based on the input to the setting input unit (operation panel 3). However, without the input to the setting input unit (operation panel 3), the blank sheet detection unit 8 may set the lengths in the main scanning width S1 and in the sub-scanning width S2 of the blank sheet detection area F to be different depending on the document size, so that the inside area defined by predetermined distances from the ends of the document sheet corresponding to the determined paper sheet size becomes the blank sheet detection area F. In other words, instead of the distances input to the operation panel 3, the predetermined distances from ends of the document sheet for blank sheet detection may be used corresponding to the determined paper sheet size, so as to determine the blank sheet detection area F.

In addition, the blank sheet detection unit 8 performs the blank sheet detection process by unit of band, which is obtained by dividing the one-page image data obtained by document reading by the image reading unit 1 into a plurality of bands in the sub-scanning direction. In this way, every time when lines in the main scanning direction of one band are read, it is detected whether or not the band is blank. Therefore, the blank sheet detection can be efficiently performed while correctly detecting whether or not the document sheet is a blank sheet.

In addition, the blank sheet detection unit 8 includes a plurality of setting registers 83, each of which stores the main scanning width S1 and position data of the main scanning width S1 of the blank sheet detection area F corresponding to each document size as the set value. The blank sheet detection unit 8 performs the blank sheet detection process at the position in the main scanning widths S1 of each of the plurality of blank sheet detection areas F corresponding to the plurality of document sizes based on the set values stored in the individual setting registers 83. In this way, by changing the set value in the register, it is possible to change the main scanning width S1 in the blank sheet detection area F.

In addition, the image forming apparatus (multifunction peripheral 1000) according to the embodiment includes the image reading device 100 according to the embodiment. Because a blank sheet is correctly deleted even if document sheets having different sizes are set for reading, wasteful printing or data transmission of a blank sheet is not performed. Thus, it is possible to provide the image forming apparatus (multifunction peripheral 1000) that can save resources and is easy to use.

The embodiment of the present invention is described above, but the scope of the present invention is not limited to this embodiment, and various modifications can be made without deviating from the spirit of the invention.

INDUSTRIAL APPLICABILITY

The present invention can be applied to an image reading device and an image forming apparatus including the image reading device.

The invention claimed is:
1. An image reading device comprising:
an image reading unit for reading a document;
a document feeder unit for feeding set document sheets one by one to a read position of the image reading unit;
a setting input unit for accepting a document read instruction in a mixed setting mode in which a plurality of document sheets having different sizes are set on the document feeder unit and are read;
a size determination unit for determining a size of each page of the document read by the image reading unit;
a blank sheet detection unit configured to repeat detection whether or not a blank sheet detection area in image data for performing blank sheet detection is blank since before one page reading of the document is completed, and in case of reading in the mixed setting mode, to detect whether or not the document sheet is a blank sheet based on a detection result in a sub-scanning width range in the blank sheet detection area corresponding to a size of the document sheet in the sub-scanning direction determined by the size determination unit in one-page document image data; and a blank sheet deletion unit for deleting image data of the document sheet whose blank sheet detection area is detected as blank, so that the image data is not used for a job;

wherein the size determination unit determines a main scanning direction size of each page of the document, and in case of reading in the mixed setting mode, the blank sheet detection unit performs in parallel a blank sheet detection process in main scanning widths of a plurality of the blank sheet detection areas corresponding to a plurality of document sizes, and detects whether or not the document sheet is a blank sheet by using a detection result in the main scanning width corresponding to the main scanning direction size of the document sheet determined by the size determination unit among detection results in different main scanning widths of the blank sheet detection areas.

2. The image reading device according to claim 1, wherein the setting input unit accepts an input for determining distances from ends of the document sheet in the document sheet as an input of setting a size and position of the blank sheet detection area in one page of the document, and the blank sheet detection unit regards an inside area defined by the set distances from ends in the sub-scanning direction of the document size determined by the size determination unit as the sub-scanning width of the blank sheet detection area, so as to detect whether or not the document sheet is a blank sheet based on a detection result in the sub-scanning width range, and sets different lengths of the main scanning width of the blank sheet detection area in accordance with the document size so that the inside area defined by the set distances from ends in the main scanning direction of the document size determined by the size determination unit becomes the blank sheet detection area.

3. The image reading device according to claim 1, wherein the blank sheet detection unit performs a blank sheet detection process by unit of band obtained by dividing one-page image data obtained by the document reading by the image reading unit into a plurality of bands along the sub-scanning direction.

4. The image reading device according to claim 1, wherein the blank sheet detection unit includes a plurality of setting registers, the setting registers respectively store the main scanning widths and position data of the main scanning widths of the blank sheet detection areas corresponding to different document sizes as set values, and the blank sheet detection unit performs the blank sheet detection process in a position of the main scanning width of each of the plurality of blank sheet detection areas corresponding to the plurality of document sizes based on the set values stored in the individual setting registers.

5. An image forming apparatus comprising the image reading device according to claim 1.

6. A method for controlling an image reading device, comprising:

reading a document;

feeding set document sheets one by one to a read position;

accepting a document read instruction in a mixed setting mode in which a plurality of document sheets having different sizes are set and are read;

determining a size of each page of the read document;

repeating detection whether or not a blank sheet detection area in image data for performing blank sheet detection is blank before one page reading of the document is completed;

detecting whether or not the document sheet is a blank sheet based on a detection result in a sub-scanning width range in the blank sheet detection area corresponding to a determined size of the document sheet in the sub-scanning direction in one-page document image data, when performing reading in the mixed setting mode; and deleting image data of the document sheet whose blank sheet detection area is detected as blank, so that the image data is not used for a job;

determining a main scanning direction size of each page of the document;

performing a blank sheet detection process in main scanning widths of a plurality of the blank sheet detection areas corresponding to a plurality of document sizes when reading in the mixed setting mode; and detecting whether or not the document sheet is a blank sheet by using a detection result in the main scanning width corresponding to the determined main scanning direction size of the document sheet among detection results in different main scanning widths of the blank sheet detection areas.

7. The method for controlling an image reading device according to claim 6, further comprising:

accepting an input for determining distances from ends of the document sheet in the document sheet as an input of setting a size and position of the blank sheet detection area in one page of the document;

regarding an inside area defined by the set distances from ends in the sub-scanning direction of the document size determined by the size determination unit as the sub-scanning width of the blank sheet detection area;

detecting whether or not the document sheet is a blank sheet based on a detection result in the sub-scanning width range; and setting different lengths of the main scanning width of the blank sheet detection area in accordance with the document size so that the inside area defined by the set distances from ends in the main scanning direction of the document size determined by the size determination unit becomes the blank sheet detection area.

8. The method for controlling an image reading device according to claim 6, further comprising:

performing a blank sheet detection process by unit of band obtained by dividing one-page image data obtained by the document reading by the image reading unit into a plurality of bands along the sub-scanning direction.

9. The method for controlling an image reading device according to claim 6, further comprising:

storing main scanning widths and position data of the main scanning widths of the blank sheet detection areas corresponding to different document sizes as set values respectively in a plurality of setting registers; and performing the blank sheet detection process in a position of the main scanning width of each of the plurality of blank sheet detection areas corresponding to the plurality of document sizes based on the set values stored in the individual setting registers.

* * * * *